US008228499B2

(12) United States Patent
Lippert et al.

(10) Patent No.: US 8,228,499 B2
(45) Date of Patent: Jul. 24, 2012

(54) METHOD FOR POSITIONING BIOLOGICAL SAMPLES IN A MICROSCOPIC ARRANGEMENT

(75) Inventors: Helmut Lippert, Jena (DE); Benno Radt, Jena (DE); Christian Dietrich, Jena (DE); Christopher Power, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 138 days.

(21) Appl. No.: 12/682,234

(22) PCT Filed: Sep. 18, 2008

(86) PCT No.: PCT/EP2008/007785
§ 371 (c)(1),
(2), (4) Date: Apr. 8, 2010

(87) PCT Pub. No.: WO2009/049740
PCT Pub. Date: Apr. 23, 2009

(65) Prior Publication Data
US 2010/0239138 A1    Sep. 23, 2010

(30) Foreign Application Priority Data
Oct. 9, 2007  (DE) .................. 10 2007 048 409

(51) Int. Cl.
*G01N 21/01* (2006.01)
*G06K 9/00* (2006.01)
*G01N 1/00* (2006.01)
(52) U.S. Cl. ............... 356/246; 356/244; 73/863.11; 73/863; 382/128
(58) Field of Classification Search ............ 356/244, 356/246, 440–442; 73/863, 863.11; 382/128; 250/458.1, 459.1; 435/7.1, 39, 177
See application file for complete search history.

(56) References Cited

U.S. PATENT DOCUMENTS
6,512,236 B2 * 1/2003 Seville ............... 250/458.1
(Continued)

FOREIGN PATENT DOCUMENTS
DE     102 57 423     6/2004
(Continued)

OTHER PUBLICATIONS

Christoph J. Engelbrecht et al., "Resolution enhancement in a light-sheet-based microscope (SPIM)", Optics Letters, OSA, Optical Society of America, Washington DC, US, May 15, 2006, vol. 31, No. 10, pp. 1477-1479.

(Continued)

*Primary Examiner* — Sang Nguyen
(74) *Attorney, Agent, or Firm* — Frommer Lawrence & Haug LLP

(57) ABSTRACT

The invention relates to methods for positioning at least one preferably biological specimen in the specimen space of a microscope arrangement, and to devices for carrying out these methods. Methods and devices are proposed, wherein the specimen's orientation relative to a detection objective's optical axis can be repeatedly changed and, in doing so, the specimen is held so that a substantially unobstructed view of the specimen is ensured from every detection direction. In different constructional variants, the specimen is held at a supporting device by adhesive forces or by a flowing medium, the specimen is held at a capillary opening by capillary action, or at least one specimen is embedded in a body of transparent gel, and the gel body is fixed in the specimen space by means of a rotatable holding device, and the detection direction is changed by rotating the holding device by a given angle of rotation.

17 Claims, 6 Drawing Sheets

U.S. PATENT DOCUMENTS

| | | | |
|---|---|---|---|
| 7,569,354 B2 * | 8/2009 | Okano et al. | 435/7.1 |
| 7,723,085 B2 * | 5/2010 | Smith et al. | 435/177 |
| 2002/0060791 A1 | 5/2002 | Stumbo et al. | |
| 2005/0085721 A1 | 4/2005 | Fauver et al. | |
| 2007/0109633 A1 | 5/2007 | Stelzer | |
| 2010/0201784 A1 * | 8/2010 | Lippert et al. | 348/46 |

FOREIGN PATENT DOCUMENTS

| | | |
|---|---|---|
| WO | WO 98/44972 | 10/1998 |
| WO | WO 2004/053558 | 6/2004 |
| WO | WO 2007/065711 | 6/2007 |

OTHER PUBLICATIONS

Notification of Transmittal of Translation of the International Preliminary Report on Patentability dated Jun. 24, 2010; The International Bureau of WIPO, Switzerland.

Jan Huisken et al., "Optical Sectioning Deep Inside Live Embryos by Selective Plane Illumination Microscopy", European Molecular Biology Laboratory (EMBL), Meyerhofstrasse 1, D-69117 Heidelberg, Germany, Aug. 13, 2004, www.Sciencemag.org vol. 305 pp. 1007-1009.

* cited by examiner

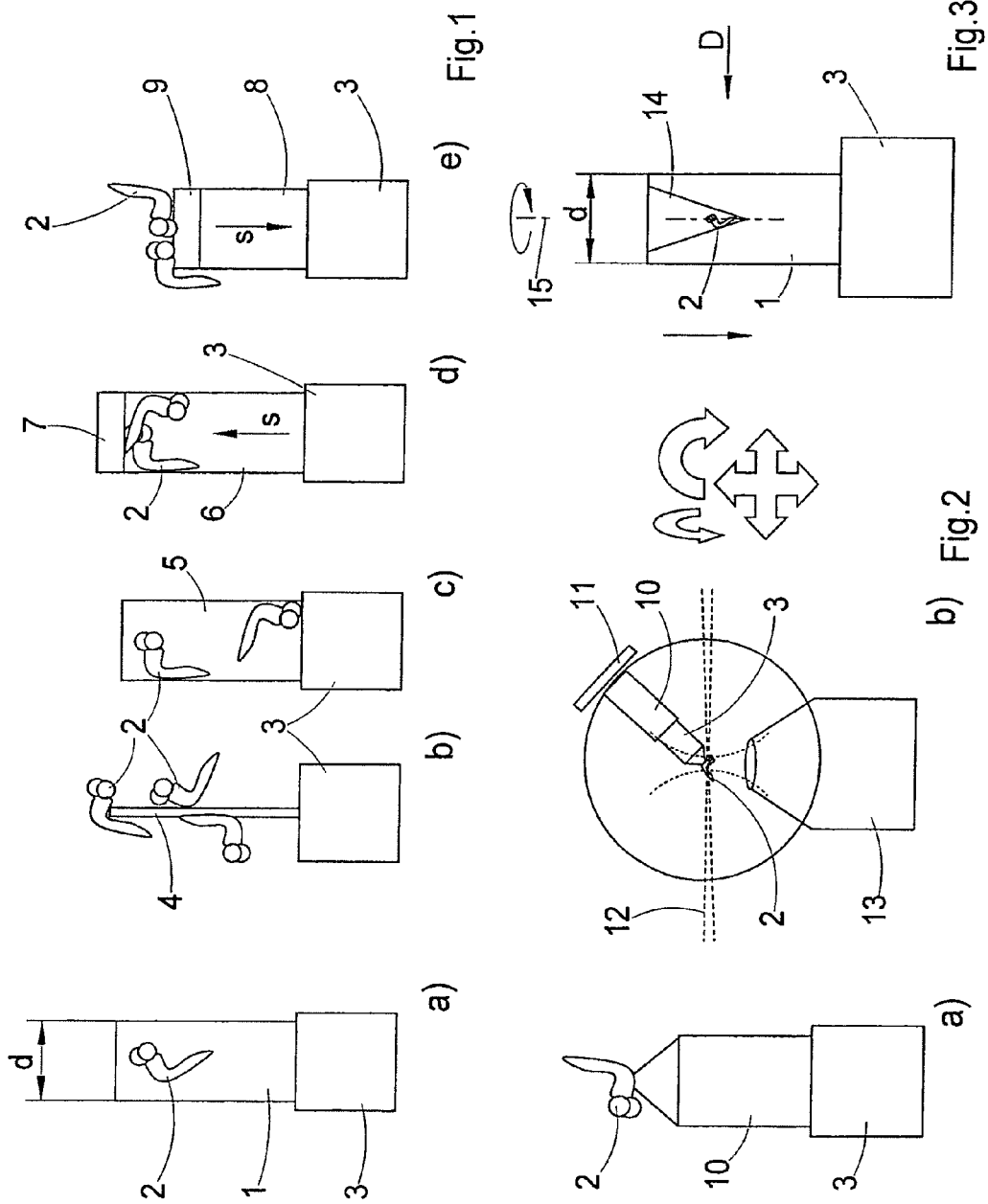

METHOD FOR POSITIONING BIOLOGICAL SAMPLES IN A MICROSCOPIC ARRANGEMENT

The present application claims priority from PCT Patent Application No. PCT/EP2008/007785 filed on Sep. 18, 2008, which claims priority from German Patent Application No. DE 10 2007 048 409.9 filed on Oct. 9, 2007, the disclosure of which is incorporated herein by reference in its entirety.

BACKGROUND OF THE INVENTION

1. Field of the Invention

The invention is directed to methods for positioning at least one preferably biological specimen in the specimen space of a microscope arrangement. The subject matter of the invention further relates to devices for applying these methods.

The specimen holder according to the invention can be applied particularly in connection with single plane illumination microscopy (SPIM), also known as selective plane illumination microscopy. Whereas in confocal laser scanning microscopy the specimen is scanned point by point in a plurality of planes at different depths and three-dimensional image information about the specimen is obtained from this, the SPIM technique is based on widefield microscopy and makes it possible to generate three-dimensional images of specimens based on optical sections through different planes of the specimen.

The advantages of SPIM include faster acquisition of images, reduced bleaching out of biological specimens, and an expanded depth of penetration of the focus in the specimen.

2. Description of Related Art

SPIM technology is described, for example, in Stelzer et al., *Optics Letter* 31, 1477 (2006), Stelzer et al., *Science* 305, 1007 (2004), DE 102 57 423 A1, and WO 2004/053558 A1.

These publications disclose, among others, a specimen holder which makes possible an optimal alignment of the specimen for the purpose of obtaining three-dimensional image data from different viewing directions. To this end, the specimen is embedded in a gel which is shaped to form a circular cylinder and this gel cylinder is inserted into a specimen chamber that is filled with an immersion medium, for example, water. In so doing, the refractive index of the gel may not differ substantially from the refractive index of the surrounding immersion medium.

The optical axis of the detection objective which collects the deflection light coming from the specimen is oriented substantially perpendicular to the axis of rotation of the gel cylinder.

Often, it is problematic to position the specimens in the specimen space in such a way that the image information obtained from the specimen coincides in spite of frequent changes in the detection direction so that a high-quality 3D image can be calculated therefrom. To the end, the specimens should be positioned in such a way that parts of the specimens of special interest can be moved into the image field in an optimal manner. Further, it is desirable that the specimens can be observed for as long as possible while still alive and that they can also be kept alive, if possible, for further use after detection.

Further, the need often arises to detect a large number of similar specimens successively in time with a high throughput per unit of time.

SUMMARY OF THE INVENTION

Therefore, it is the object of the invention to propose methods and devices which make it possible to position at least one preferably biological specimen in the specimen space of a microscope arrangement with high efficiency.

This object is met by method steps in which the orientation of the specimen relative to the optical axis of a detection objective can be repeatedly changed and, in doing so, the specimen is held in such a way that a substantially unobstructed view of the specimen or of parts of the specimen is ensured from every detection direction, wherein, in different embodiment variants:

the specimen is held at the outer surface or at the inner surface of a supporting device by adhesive forces, the specimen is held at the outer surface or at the inner surface of a supporting device by a flowing medium, the specimen is held at a capillary opening for a liquid medium by capillary action, or at least one specimen is embedded in a body of transparent gel, the gel body is fixed in the specimen space by means of a rotatable holding device, and the detection direction is changed by rotating the holding device by a given angle of rotation.

In the latter case, a preferred procedure consists in that the gel is initially pre-shaped to form a gel body which is provided with a cutout for the specimen, and the specimen is then inserted into the cutout and positioned inside the cutout.

In a particularly preferred manner, the gel body is provided with a cutout in the form of a hollow cone. The specimen is positioned in the apex of the hollow cone and held there under the influence of a small force which does not endanger the life of the specimen.

For example, the gel body with the specimen is fixed in the holding device in such a way that the specimen is held in the apex of the hollow cone under the influence of Earth's gravity also when rotated, which is achieved by means of a corresponding orientation of the gel body.

This embodiment not only has the advantage that the specimen located in the cutout moves relatively freely and can also continue to grow in circumference, but it can also be removed from the gel body again after observation and/or detection and is accordingly available for further analyses.

Alternatively, a method according to the invention consists in that the cutout is covered after insertion of the specimen or a transparent medium is introduced into the cutout after insertion of the specimen, and the specimen is held in its position in the cutout, preferably at the apex of a hollow cone, by this medium.

In a particularly advantageous manner, a medium used for this purpose is initially liquid, but then hardens within a period of time and below a given temperature so that the specimen is fixed in its position inside the cutout after hardening.

In order to achieve a higher throughput when detecting a plurality of specimens, the gel is initially pre-shaped according to the invention to form a gel body and the pre-shaped gel body is provided with a quantity of cutouts which corresponds to the quantity of specimens, whereupon a specimen is inserted into a cutout, respectively, and positioned and, if required, fixed within the cutout.

Optionally, the specimens can be inserted into the cutouts successively in time or simultaneously, and the cutouts are closed by a cover after inserting the specimens.

In another special embodiment, the gel body is initially heated in the area of a cutout in which a specimen is to be inserted, the specimen is then inserted, whereupon a medium which is initially liquid but which then hardens is introduced into the cutout, whereupon the gel body is cooled in the area of this cutout which has already been charged with the specimen and filled with the hardening medium in order to accelerate hardening or shorten the duration of the hardening process to a predetermined time period.

In this connection, it is again advantageous when the gel body is heated in the area of a first cutout within a given time interval and the specimen is then inserted into this cutout and the hardening medium is introduced into this cutout, while the gel is heated in the area of a second cutout at the same time, whereupon the gel is cooled in the area of the first cutout, while the specimen is inserted at the same time into the second cutout, the hardening medium is introduced, and the gel is preheated in the area of a third cutout, whereupon the gel is cooled in the area of the second cutout, while the specimen is insetted at the same time into the third cutout, the hardening medium is introduced, and the gel is preheated in the area of a third cutout, and so on until a specimen is contained and fixed in every cutout.

With respect to the insertion of the specimens into the cutouts, a plurality of specimens can be kept in a specimen reservoir and specimens can be removed individually from this reservoir and inserted into the cutouts. The singling of the specimens and the insertion into the cutouts should advantageously be carried out in an automated manner.

The transporting of the specimens from the specimen reservoir to an insertion position and the insertion into the cutouts is advantageously carried out through a syringe. The specimens are advantageously also positioned at the outer surface or inner surface of a supporting device at a capillary opening through a syringe.

As alternatives to the method in which a plurality of specimens are inserted into a gel body, each specimen can be embedded individually in a gel body associated with it, the gel bodies, each of which contains a specimen, can be moved individually and successively in time into the specimen space and removed from the specimen space again after detection of the enclosed specimen.

According to the invention, a specimen can be embedded in a body of gel in that a first partial amount of the gel is inserted into a first half of a syringe that is divided in longitudinal direction, the specimen is then placed on this partial amount, whereupon a second partial amount of the gel is placed on the specimen, the second half of the divided syringe is put under pressure so that the gel is shaped into a gel body as a result of the cylindrical hollow shape formed between these two halves, the outer diameter of the gel body corresponding to the inner diameter of the syringe, and the specimen is enclosed in the gel body.

Of course, it lies within the scope of the invention to divide the syringe in some other way rather than in longitudinal direction or, instead of the syringe, to use a similarly shaped object to fulfill the same purpose.

If it is desirable to center the embedded specimen inside the gel body subsequently, the gel body comprising gel in a not yet hardened state is introduced into a monitoring station with the enclosed specimen, the position of the specimen inside the gel body is evaluated by means of the monitoring station and, as a result of this evaluation, the gel body is oriented relative to Earth's gravity in such a way that the specimen drops into the desired position within the gel body under the influence of gravitational force.

The monitoring station can be designed for visual inspection by an operator or also for optoelectronic monitoring by means of sensors and an evaluating circuit.

In order that specimens taken from biological or other substances of larger dimensions can also be detected, according to the invention, a syringe with a sharply ground end facing the substance is pressed into the substance, then, when the syringe is withdrawn from the substance, the partial amount is held in the syringe (35) by means of a plunger which is guided so as to be displaceable inside the syringe and which is connected to a push rod linkage, and the syringe with the partial amount is finally moved into the specimen space, where the partial amount is partially pushed out of the syringe by means of the push rod linkage and plunger, and the pushed out portion is detected as sample, while the remaining portion is held by the syringe.

Agarose gel, for example, can be used as gel in which the specimens are embedded and also as hardening medium.

The object of the invention is further met by devices which are described in the following in various constructional variants.

For example, a first constructional variant of a device for positioning at least one biological specimen in the specimen space of a microscope arrangement comprises:
  a reservoir for gel bodies of identical shape and size, wherein a specimen is enclosed in each of the gel bodies,
  a holding device located in the specimen space for holding one of the respective gel bodies,
  a removing and depositing device for removing the gel bodies individually from the gel body reservoir and depositing them in the holding device, and
  a removing and transporting device for removing and transporting the gel bodies from the holding device.

Optionally, this device can be outfitted in addition with an image evaluating device and a sorting device which can be controlled depending on the results of the image evaluation and by means of which the gel bodies can be sorted into different storage vessels after removal from the holding device.

A second constructional variant of the device according to the invention for positioning at least one biological specimen in the specimen space of a microscope arrangement comprises:
  a gel body in which a plurality of specimens are enclosed,
  a forward feed device which receives the gel body and which, when actuated, causes the gel body to be displaced in such a way that the enclosed specimens are guided through the specimen space successively in time, wherein a three-dimensional image of each specimen is obtained.

This second constructional variant can optionally be outfitted in addition with an image evaluating device, a motor drive for the forward feed device, and a control circuit which communicates with the image evaluating device and with the drive, the control circuit being designed in such a way that after the three-dimensional image is completed a control command is generated for the drive, which control command triggers a forward feed movement and, therefore, causes an exchange of specimens in the specimen space.

A third constructional variant of the device according to the invention is provided with:
  a gel body having cutouts, each for an individual specimen, at a plurality of positions,
  a feed device for removing individual specimens from a specimen reservoir and for transporting them to an insertion position, and
  a forward feed device which receives the gel body and which, when actuated, causes the gel body to be displaced in such a way that the cutouts arrive successively in time at the insertion positions, where a specimen is inserted into one of the cutouts.

This third constructional variant can additionally be outfitted with a feed device for supplying and inserting a hardening medium into the cutout after inserting a specimen.

In this connection, a heating station and/or cooling station can be provided which communicate(s) with the gel body so as to conduct heat and which causes a heating of the gel body at least in the area of a certain cutout before the insertion of the medium and/or a cooling of the gel body at least in the area of a certain cutout after insertion of the medium.

In this respect, it is particularly advantageous when the time period for the insertion of the specimen, for the insertion of the medium, and for the heating or cooling are adjusted to one another in such a way, taking into account the property of the hardening medium, that a uniform forward feed speed is achieved for the charging process.

It also lies within the scope of the invention when particularly the second and third constructional variants of the device according to the invention are outfitted with a cutting device for cutting out the cutouts in the gel body which are intended for receiving specimens.

For example, the cutting device can have a rotating knife for cutting conical or cylindrical parts of the gel out of the gel body.

It is also advantageous when a syringe is associated with the cutting device for feeding an individual specimen into a cutout. It is possible to charge the pre-shaped gel bodies with specimens in a time-saving manner by cutting out the cutout and inserting the specimen in one and the same position virtually in immediate succession.

BRIEF DESCRIPTION OF THE DRAWINGS

FIG. 1 shows an example for embedding a specimen in a transparent gel and several examples for holding a specimen at the outer surface or inner surface of a supporting device;

FIG. 2 shows an example for holding a specimen by means of capillary action;

FIG. 3 shows an example for a pre-shaped gel body which is provided with a cutout for a specimen;

DETAILED DESCRIPTION OF EMBODIMENTS

Figure 4:
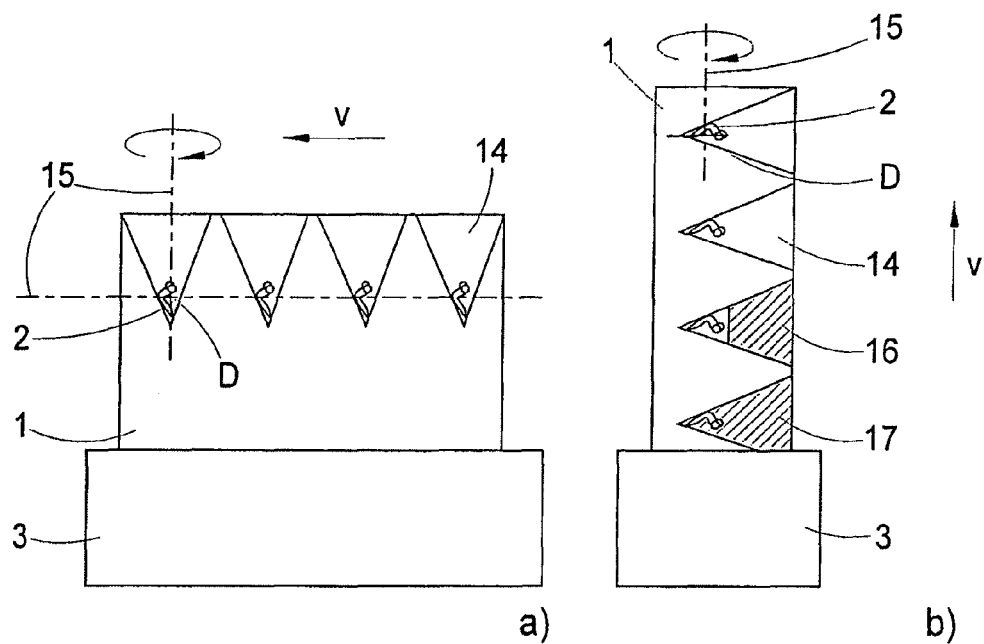
FIG. 4 shows an example for a pre-shaped gel body which is provided with a plurality of cutouts for specimens.

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

FIG. 1 shows various embodiment examples for non-destructive positioning of a biological specimen in the specimen space of a microscope arrangement, preferably for obtaining a three-dimensional image of the specimen, particularly by single plane illumination microscopy (SPIM).

In FIG. 1a, a specimen 2, for example, a zebrafish embryo, is embedded in a gel 1 which is shaped to form a circular cylinder having a diameter d. The cylinder of gel 1 is placed on a specimen holder 3 which is located in the specimen space of the microscope arrangement. By specimen space is meant within the meaning of the present invention the area lying in the detection area of a microscope objective, also referred to as the detection objective in connection with the invention.

This procedure of embedding an individual specimen 2 in a transparent gel 1 which is described with reference to FIG. 1a is known from the prior art. It has the drawback that the life span of the specimen 2 is extremely limited because its freedom of movement and the possibility of its growth are limited. Further, it is often desirable to keep the specimen 2 alive after the microscopic examination and to have it available for further observation. This is not possible with this method. A further disadvantage consists in that the gel has a refractive index that diverges from the surroundings, for example, from a surrounding immersion liquid, and the image of the specimen is therefore not optimal with respect to the image quality achieved.

A device according to the invention which substantially overcomes these disadvantages is shown in FIG. 1b. In this case, three specimens 2, for example, zebrafish embryos again, are bound by adhesive forces to a rod 4 acting as supporting device. The rod 4 is likewise made of a transparent material, for example, a hardened gel, and is located together with the specimens 2 inside an immersion liquid, for example, water.

The quantity of three specimens 2 is selected in this case only by way of example.

The advantage consists in that each of the specimens 2 has freedom of movement and their growth is also not limited. Also, keeping the specimens alive after observation does not pose a problem because the specimen can be removed from the rod 4 again in a simple manner.

FIG. 1c shows a hollow body 5, specimens 2 being held at its inner wall by adhesive forces. Aside from the advantages of freedom of movement and indeterminate growth, this affords the additional advantage that the specimens 2 do not come into contact with the immersion liquid. Also, it is not difficult in this case to preserve the life of the specimens 2 after observation and/or microscopic imaging.

As in FIG. 1a and FIG. 1b, the hollow body 5 is also positioned on a specimen holder 3. The walls of the hollow body 5 are made of a transparent material, for example, again a hardening gel with refractive properties coming as close as possible to those of the immersion medium.

FIG. 1d again shows a hollow body 6 which, in this case, is open at its end facing the specimen holder 3 and at its end remote of the specimen holder 3. Liquid or gaseous medium flows through this hollow body 6 in arrow direction S proceeding from the specimen holder 3.

The specimens 2 are entrained by the flowing medium to the filter 7. The filter 7 can pass the flowing medium, but not the specimens 2. As regards preserving the life of the specimens 2 and further use of the specimens 2, the advantages are virtually the same as in the construction according to FIG. 1b and FIG. 1c.

FIG. 1e shows the reversal of the procedure according to FIG. 1d, the only difference being that the specimens 2 are now located outside a hollow body 8 and the flow of liquid or gaseous medium is guided in the opposite direction through a filter 9 and the hollow body 8 to the specimen holder 3. The flowing medium ensures that the specimens 2 are held at the filter 9.

FIG. 2 shows an example for holding a specimen 2 by means of capillary action. The principle is illustrated in FIG. 2a. In this case, a capillary 10 filled with a liquid medium is positioned on a specimen holder 3. An individual specimen 2 is held at the capillary opening.

FIG. 2b shows the advantages in constructing the device according to the invention in this way. In this case, the specimen holder 3 is fastened, together with the capillary 10 and the specimen 2, to a positioning device 11 which is preferably adjustable in six degrees of freedom with respect to the orientation of the specimen 2. Accordingly, it is possible to hold the specimen 2 in many different orientations relative to a light sheet 12 and a detection objective 13.

FIG. 3 again shows an example for holding and positioning a specimen 2 by means of a gel 1 which, in this case again, is shaped to form a cylinder with diameter d and is fastened to a specimen holder 3. However, some of the gel 1 has been removed from this gel cylinder so as to form a cutout 14 in the shape of a hollow cone.

The apex of the hollow cone is located in the axis of rotation 15 around which the specimen holder 3 is rotatably supported. When a specimen 2 is inserted into the cutout 14 and the gel cylinder is correspondingly oriented relative to Earth's gravity, the specimen 2 is lowered into the apex of the hollow cone and is accordingly in a centered position with respect to the axis of rotation 15.

Therefore, both gel cylinder and specimen 2 rotate along with the specimen holder 3 and accordingly permit detection from direction D at viewing angles that can vary through rotation within an angular range from 0° to 360°.

This also has the advantage that the specimen 2 can be removed from the gel cylinder after observation and/or detection and be available for further use.

FIG. 4 shows a gel body which is pre-shaped from a transparent gel 1 and which has a plurality of cutouts 14 in the form of hollow cones, each for a specimen 2. The device according to the invention which is constructed in this way can be positioned in such a way that the specimens 2 inserted into the cutouts 14 sink into the apexes of the hollow cones under the influence of Earth's gravity and remain there during observation and/or while image information is obtained.

This device is advantageously connected to a forward feed device (not shown in the drawing) which causes a forward feed movement in direction V, for example, at the command of an operator or a control circuit.

The forward feed movement causes the cutouts 14 which are occupied, respectively, by a specimen 2 to be moved successively in time into the optical axis of a detection objective.

In the view selected in FIG. 4a, the optical axis of the detection objective and, therefore, also the detection direction are oriented perpendicular to the drawing plane. As in FIG. 3, the detection direction extending perpendicular to the drawing plane is also indicated here by D.

In this case, as was already described with reference to FIG. 3, the holding device 3 can be arranged on a swiveling device which makes it possible to rotate the specimen 2 around an axis of rotation 15 extending in the drawing plane. In so doing, the axis of rotation 15 intersects the detection direction D at right angles. However, the selection of detection directions is limited because the rest of the specimens contained in the gel 1 cause shadows to some extent.

This disadvantage is remedied, for example, by the device according to FIG. 4b. In this case, a plurality of specimens 2 are likewise embedded in a gel 1 which is pre-shaped to form a gel body, and all of the embedded specimens 2 lie in the axis of rotation 15.

As in FIG. 4a, the detection direction D also encloses a right angle with the axis of rotation 15 and is oriented perpendicular to the drawing plane.

However, in this case the specimens 2 are not held in the apex of the hollow cone of the cutouts 14 by Earth's gravity. In order to ensure the positioning of the specimens 2 in spite of this, the cutouts 14 are either closed by a pre-shaped plug 16 of gel that has already hardened or are filled with a gel 17 which is initially liquid but which then hardens.

The latter is carried out in the orientation of the gel body shown in FIG. 4a, wherein the specimens 2 initially drop into the apex of the hollow cone under the influence of Earth's gravity. When all of the cutouts 14 have been provided with hardened gel and the specimens 2 are accordingly fixed in the apex of the hollow cone, the gel body is moved into the position shown in FIG. 4b.

In order to position the cutouts with the specimens 2 in the detection direction successively in time, a forward feed device (not shown in the drawing) is again provided and advances the gel body in direction V.

Figure 5:
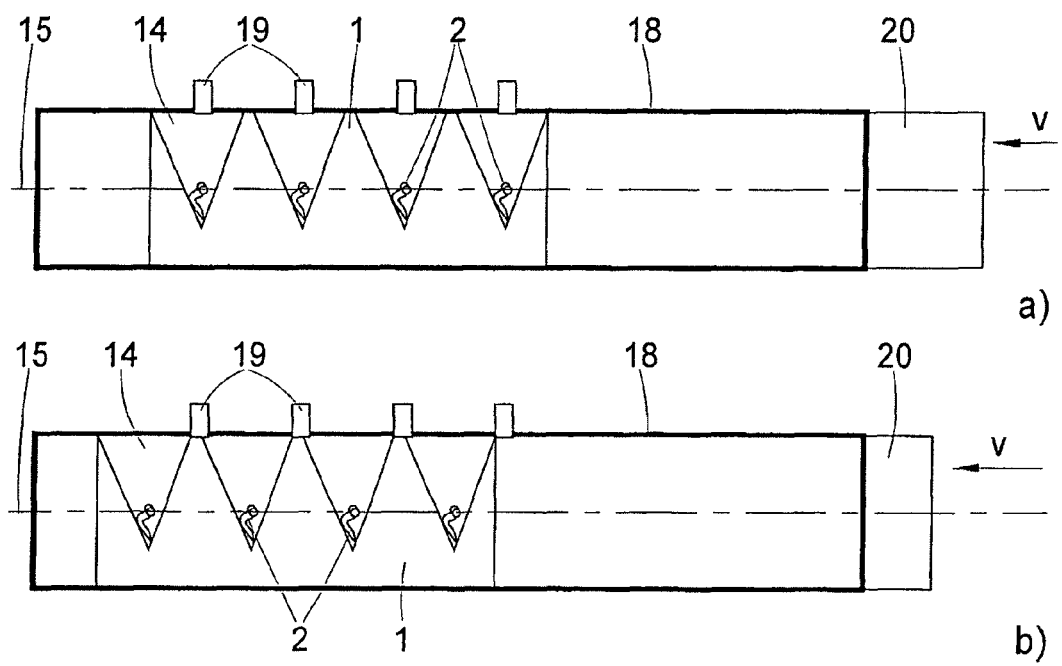
FIG. 5 shows an example for a pre-shaped gel body which is provided with a plurality of cutouts for specimens and with a mechanism for closing the cutouts after insertion of the specimens.

FIG. 5 shows the constructional variant of a device for filling a gel body provided with a plurality of cutouts 14. In this case, the gel 1 is initially enclosed by a tube 18 which has fill openings 19. The quantity of fill openings 19 corresponds to the quantity of cutouts 14.

The gel body is displaceable inside the tube 18 so that the position of the cutouts 14 relative to the fill openings 19 can be changed. In the view in FIG. 5a, the fill openings 19 are positioned over the cutouts 14 so that, first, a specimen 2 and then, insofar as intended and required, a hardening gel can be inserted through all of the fill openings 19.

After inserting the specimens 2 and the hardening gel into the cutouts 14, the gel body is so displaced inside the tube 18 in direction V by means of a plunger 20 that the configuration shown in FIG. 5b results, wherein the fill openings 19 are now offset relative to the cutouts 14 and the cutouts 14 are accordingly closed.

After filling, the gel body is either removed from the tube 18 and handled in the manner described with reference to FIG. 4 or the gel body remains in the tube 18 and the tube 18 is arranged together with the gel body and the specimens 2 on a holding device (not shown in FIG. 5) in such a way that a rotation can be carried out around the axis of rotation 15 shown in the drawing.

Of course, this assumes that the tube 18 is fabricated from a transparent material which has substantially the same refractive index as the gel 1 and the immersion liquid located in the specimen space. As was already described with reference to FIG. 4, the specimens 2 are pushed into the optical axis of a detection objective successively in time for detection.

Figure 6:
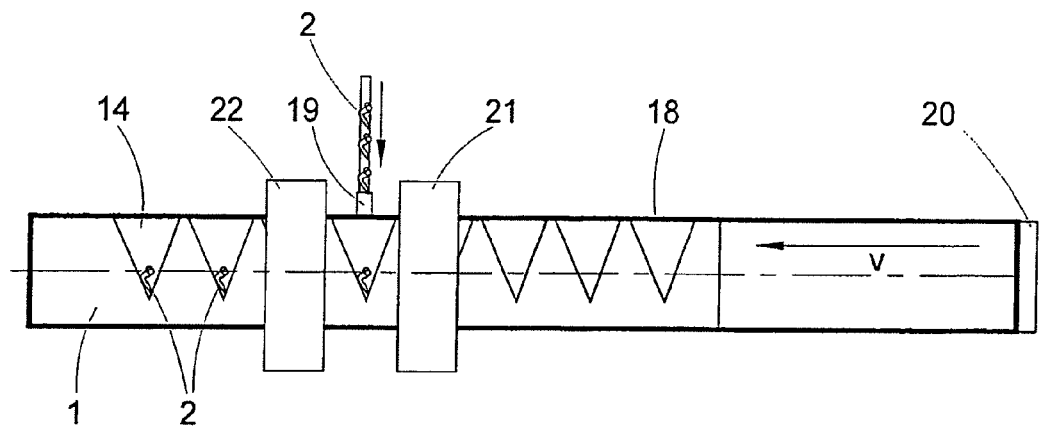
FIG. 6 shows an example for a pre-shaped gel body which is provided with a plurality of cutouts for specimens in connection with a feed device for individual specimens and with a heating and cooling station.

In another variant of a filling device which is described with reference to FIG. 6, the gel 1 is again located in a tube 18. However, in this case only one fill opening 19 is provided. Again, the fill opening 19 is intended for feeding a specimen 2 into one of the cutouts 14. A plunger 20 is again provided in this case and pushes the gel 1 forward in direction V by a given amount upon a control command which is issued manually or automatically.

In contrast to the view shown in FIG. 5, a heating station 21 and a cooling station 22 are provided in addition. The heating station 21 and cooling station 22 surround the tube 18. The fill opening 19 is located between the heating station 21 and the cooling station 22.

This filling device operates as follows: while a specimen 2 is introduced into the cutout 14 through the fill opening 19, the gel 1 is pre-heated in the area of the cutout 14 which is surrounded by the heating station 21. At the same time, the gel 1 is cooled in the area of the cutout 14 which is surrounded by the cooling station 22.

After a specimen 2 is introduced through the fill opening 19 into the cutout 14 between the heating station 21 and the cooling station 22, the gel 1 is displaced by means of the plunger 20 by an amount corresponding to the distance between two cutouts 14 so that the cutout 14 that has just been filled is located in the area of the cooling station 22 and is cooled, and the cutout 14 which has been pre-heated in the area of the heating station 21 up until this time is now located between the heating station 21 and the cooling station 22 below the fill opening 19, and another cutout 14 has been displaced into the area of the heating station 21, where it is pre-heated.

Optionally, this filling device can also be operated in such a way that a hardening gel is also introduced through the fill opening 19 immediately after the specimen 2. In this way, the cutout 14 which is pushed forward under the fill opening 19 and comes from the heating station 21 so as to be preheated receives the hardening gel so that this gel is held in the hollow cone-shaped cutout 14 initially with a runny consistency and can completely fill the cutout 14, and the specimen 2 contained therein can be fixed in position. After the filled cutout 14 is moved into the area of the cooling station 22, the hardening is accelerated as a result of the cooling.

This filling device is advantageously connected to a control circuit which ensures that the interval of time after which the gel 1 is displaced by a distance in direction V between two cutouts 14 is adapted to the time interval for filling with a specimen 2 and to the hardening of the inserted gel. In addition, the process times for preheating and cooling are adapted to this time interval in that the level of the heating temperature and cooling temperature is specified in a corresponding manner.

Figure 7:
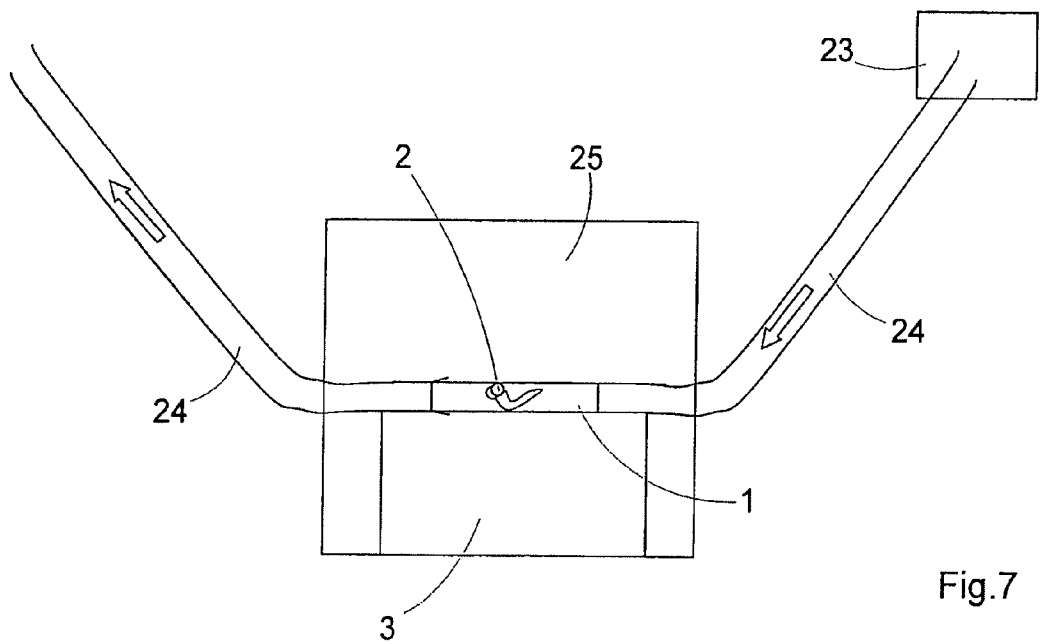
FIG. 7 shows the example of a feed device for feeding individual gel bodies to the specimen space, wherein a specimen is enclosed in every gel body.

FIG. 7 shows an embodiment of the device according to the invention in which an individual specimen 2 is enclosed by a gel 1 shaped into a circular cylinder and a plurality of these gel bodies are located in a gel body reservoir 23 indicated schematically in FIG. 7. In the operation of this device, the gel bodies are removed individually from the gel body reservoir 23, conveyed through a tube 24 into the specimen space 25, which is likewise indicated schematically, and positioned therein on the holding device 3 in such a way that the specimen 2 is located in the optical axis and, therefore, in the detection direction of a detection objective.

After observation and/or detection, the respective gel body is transported out of the specimen space 25 again through a tube 24.

When this process is automated, a high throughput of specimens 2 can also be achieved in this way.

Figure 8:
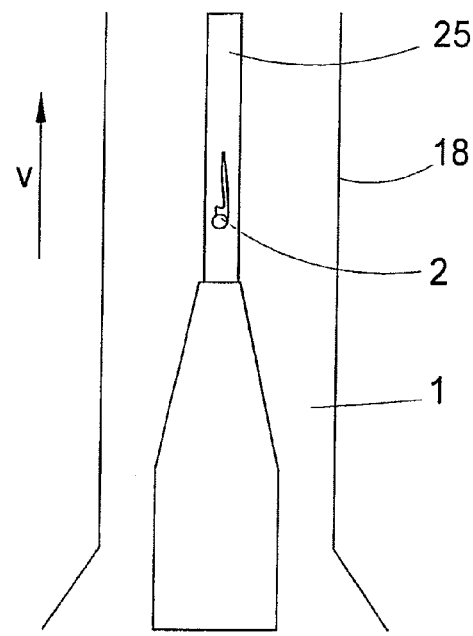
FIG. 8 shows a first example of a singling and feeding device for specimens by means of an injection action.

FIG. 8 shows a first example of a singling and feeding device for the specimen 2 which makes use of injection action. In this case, a specimen 2 is carried along out of a feed syringe 25, for example, by means of the suction effect of a gel 1 which is pushed forward through a tube 18 in direction V.

Figure 9:
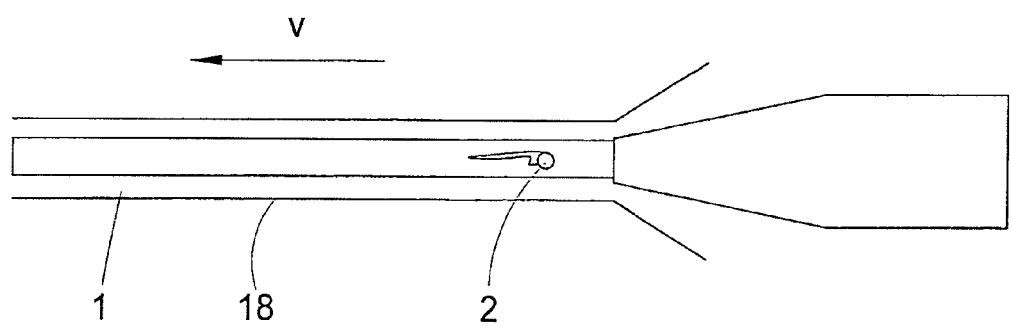
FIG. 9 shows a second example of a singling and feed device for specimens by means of an injection action.

FIG. 9 shows other constructions of devices making use of injection action, wherein a liquid 26, in special cases an immersion liquid, provides for the suction effect instead of the gel 1.

Figure 10:
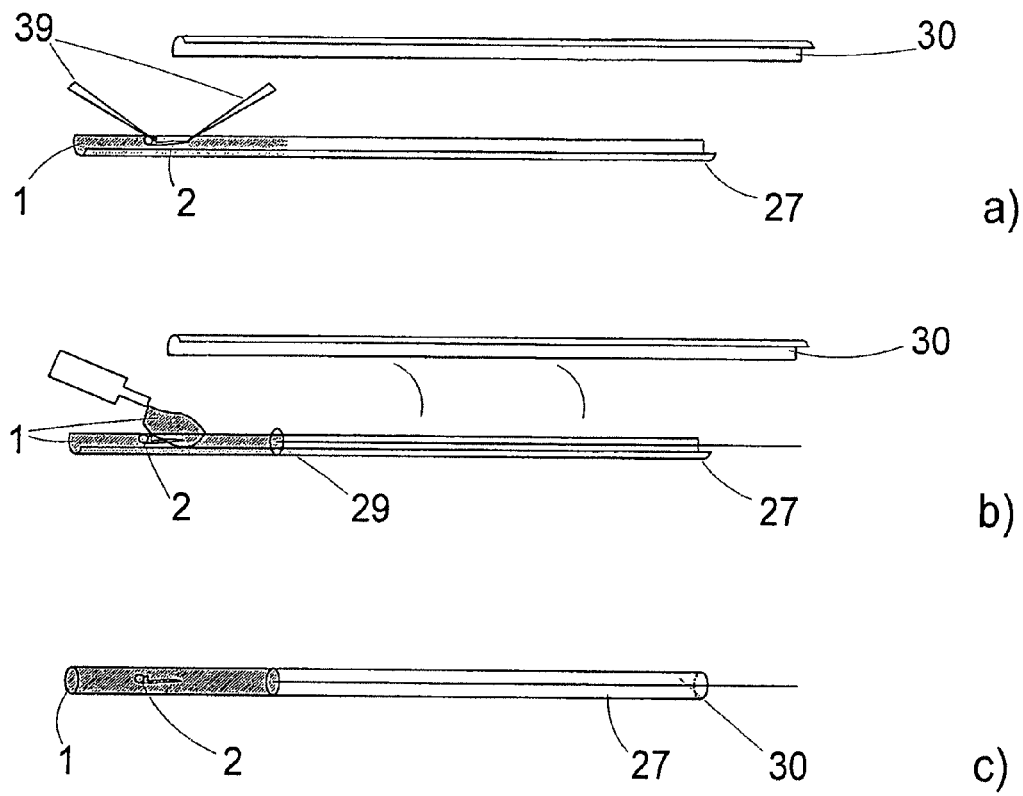
FIG. 10 shows an example for a method and an associated device for embedding a specimen in a gel body.

An advantageous method and associated apparatus for embedding a specimen 2 in a gel 1 is shown in FIG. 10.

In this case, a relatively small amount of a hardening gel 1 which is initially still soft is first inserted into the bottom part 27 corresponding to the first half of a syringe divided in longitudinal direction, and a specimen 2 is placed on this amount of gel (see FIG. 10a) with aligning tools 39.

After this, as is shown in FIG. 10b, the specimen 2 is covered with another amount of a gel 1 which is still soft. The two portions of gel 1 combine and enclose the specimen 2 between them. A push rod linkage 28 with a plunger 29 fastened to one of its ends is now inserted into the bottom part 27 in such a way that the plunger 29 is located between the gel 1 and the end of the bottom part 27 remote of the gel 1.

The top part 30 which corresponds to the second half of the longitudinally divided syringe is then placed on the bottom part 27 under a suitable pressure so that the gel 1 is shaped to form a gel body as a result of the cylindrical hollow shape formed between these two parts, the outer diameter of this gel body corresponding to the inner diameter of the syringe.

In so doing, the specimen 2 is completely enclosed by the gel 1. The gel body is subsequently pushed out by the plunger 29 through the advancing movement of the push rod linkage 28 in direction V and is available for further use, for example, in connection with the construction of the device according to the invention which was described with reference to FIG. 7.

Figure 11:
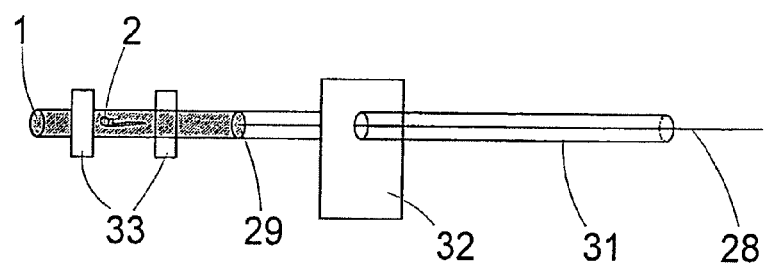
FIG. 11 shows an example for a method and an associated device for defined positioning of a specimen inside a gel body according to FIG. 10.

In order to ensure that the specimen 2 is also positioned centrally (i.e., in the longitudinal axis of a gel body produced in this way) a method and a device are proposed according to FIG. 11 for checking and, if need be, correcting the position of the specimen 2 within the gel body, namely, before the gel 1 is hardened to the extent that such a possibility of correction no longer exists.

To this end, the gel body with the enclosed specimen 2 is pushed by means of the push rod linkage 28 and plunger 29 into a syringe 31 which is supported so as to be rotatable around its longitudinal axis and which is coupled with a rotary drive 32 to generate a rotating movement.

The gel body with the specimen 2 is pushed forward in this syringe 31 until reaching a monitoring station 33 which can be designed for visual inspection by an operator or, as will be shown in the following by way of example, by optoelectronic means (e.g., in the form of a light barrier). The light source and the detector of the light barrier are arranged opposite one another on either side of the syringe 31 which has an outer wall that is transparent for the light coming from the light source at least in the area of this monitoring station 33.

This device is operated in such a way that the syringe 31 is initially not set in rotation during the advancing of the gel body. When the specimen 2 is located in the area of the light barrier, the light barrier checks whether or not the specimen 2 is positioned in the longitudinal axis. If the specimen is located below the longitudinal axis, the syringe 31 together with the gel body is caused to rotate until the specimen 2 lies above the longitudinal axis and, accordingly, above the axis of rotation. Since the gel 1 is not yet hardened, the specimen 2 sinks under the influence of Earth's gravity and, in so doing, approaches the rotational axis and longitudinal axis while the hardening process of the gel 1 progresses.

If the hardening of the gel 1 has not yet advanced to the point that the specimen 2 remains in its desired position in the axis of rotation but sinks again below the axis of rotation, the syringe 31 is rotated by 180° so that the specimen 2 again lies above the axis of rotation, whereupon it sinks again and these process steps are repeated until the specimen 2 is finally fixed in the axis of rotation inside the gel 1 which is now hardened. The specimen can then be pushed out by means of the push rod linkage 28 and plunger 29 and is available for use in the device which was described with reference to FIG. 7.

Although the methods and associated devices according to the invention have so far been described with reference to specimens 2 having relatively small dimensions such as zebrafish embryos, for example, the inventive idea also extends to methods and devices which are suitable for examining specimens taken from biological or other substances having larger dimensions.

Figure 12:
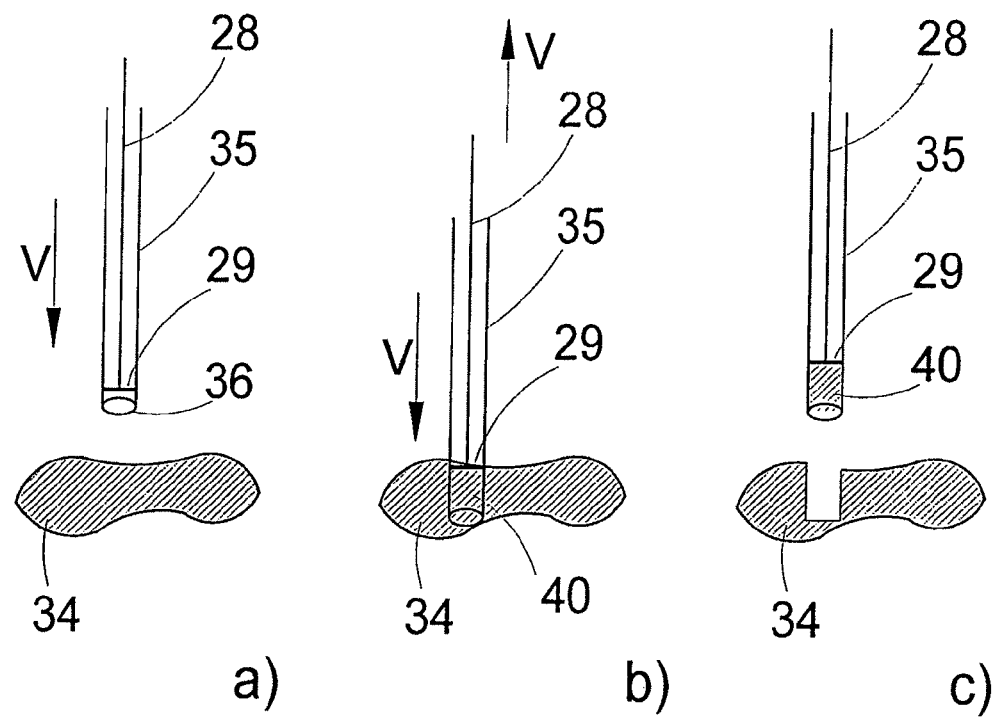
FIG. 12 shows an example of a procedure for removing a specimen intended for detection from a substance to be analyzed.

FIG. 12 shows a method and associated device in this regard.

In order to remove a sample 40 as partial amount from a biological substance 34, for example, from brain tissue, a syringe 35 which is sharply ground at its end 36 facing the substance 34 is inserted into the substance 34 in direction V (see FIG. 12*a*). In so doing, the sample 40 is separated from the substance 34, enclosed by the syringe 35 and, with the removal of the syringe 35 in direction V, removed from the substance 34 (see FIG. 12*b* and FIG. 23*c*). The removal can be assisted, if necessary, by a push rod linkage 28 with plunger 29 which is guided inside the syringe 35 and which was already shown in FIG. 10 and FIG. 11. In this way, a vacuum is generated in the syringe 35 so that the sample 40 is held in the syringe and also remains there when the syringe 35 is withdrawn from the substance 34.

As is shown in FIG. 12*d*, the syringe 35 is now moved along with the sample 40 into the specimen space of a microscope arrangement for detecting the sample 40, wherein the sample 40 is pushed out of the syringe 35 by means of the push rod linkage 28 and plunger 29 until it is partly located in the detection area of a detection objective 37, but the remaining part is still held inside the syringe 35.

When the syringe 35 is supported so as to be rotatable around an axis of rotation 38 in a special construction, different detection directions can be adjusted by rotating the syringe 35 around this axis of rotation 38.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

| REFERENCE NUMBERS: | |
|---|---|
| 1 | gel |
| 2 | specimen |
| 3 | specimen holder |
| 4 | rod |
| 5, 6 | hollow body |
| 7 | filter |
| 8 | hollow body |
| 9 | filter |
| 10 | capillary |

| REFERENCE NUMBERS: | |
|---|---|
| 11 | positioning device |
| 12 | light sheet |
| 13 | detection objective |
| 14 | cutout |
| 15 | axis of rotation |
| 16 | plug |
| 17 | gel |
| 18 | tube |
| 19 | fill openings |
| 20 | plunger |
| 21 | heating station |
| 22 | cooling station |
| 23 | gel body reservoir |
| 24 | tube |
| 25 | specimen space |
| 26 | liquid |
| 27 | bottom part |
| 28 | push rod linkage |
| 29 | plunger |
| 30 | top part |
| 31 | syringe |
| 32 | rotary drive |
| 33 | monitoring station |
| 34 | substance |
| 35 | syringe |
| 36 | end |
| 37 | detection objective |
| 38 | axis of rotation |
| 39 | aligning tools |
| 40 | sample |
| d | diameter |
| s, D, V | directions |

The invention claimed is:

1. A method for positioning at least one specimen in a specimen space of a microscope arrangement, the method comprising:
   repeatedly changing the orientation of the specimen relative to the optical axis of a detection objective; and
   obtaining image information from the specimen from every resulting detection direction;
   wherein, during the step of repeatedly changing the orientation of the specimen, the specimen is held in such a way that a substantially unobstructed view of the specimen or of parts of the specimen is ensured from every detection direction;
   wherein the specimen is embedded in a transparent gel, the gel is shaped to form a gel body, and the gel body is fixed in the specimen space by means of a holding device which is rotatable around an axis of rotation perpendicular to the optical axis of the detection objective;
   wherein the detection direction is changed by a rotation of the holding device;
   wherein a specimen is positioned at a predetermined position within the gel; and
   wherein the gel is initially pre-shaped to form a gel body which is provided with a cutout for the specimen, the specimen is then inserted into the cutout, and the specimen is positioned inside the cutout.

2. The method according to claim 1;
   wherein the specimen is held at the outer surface or at the inner surface of a supporting device by adhesive forces.

3. The method according to claim 1;
   wherein the specimen is held at the outer surface or at the inner surface of a supporting device by the dynamic pressure exerted on the specimen by a flowing medium.

4. The method according to claim 1;
   wherein the specimen is held at a capillary opening for a liquid medium by capillary action.

5. The method according to claim 1;
wherein the gel body is provided with a cutout in the form of a hollow cone, the specimen is inserted into the hollow cone, and the specimen is held in the apex of the hollow cone under the influence of a small force which does not endanger the life of the specimen.

6. The method according to claim 5;
wherein the gel body is fixed in the holding device in such a way that the specimen is held in the apex of the hollow cone under the influence of the Earth's gravity also when the holding device is rotated.

7. The method according to claim 5;
wherein a transparent medium is introduced into the cutout after insertion of the specimen, and the specimen is held in the apex of the hollow cone by the inserted medium.

8. The method according to claim 7;
wherein a medium which is initially liquid but which then hardens within a period of time and below a given temperature is introduced into the cutout, and the specimen is fixed in its position inside the cutout by the hardened medium.

9. The method according to claim 8;
wherein agarose gel is used as gel and as hardening medium.

10. The method according to claim 1;
wherein a plurality of specimens are positioned inside the gel, in that the gel is initially pre-shaped to form a gel body which is provided with a cutout for each specimen, the specimens are then inserted into the cutouts, and each specimen is positioned within a cutout.

11. The method according to claim 10;
wherein the specimens are inserted into the cutouts and positioned in the cutouts successively in time or simultaneously.

12. The method according to claim 10;
wherein the cutouts are closed by individual covers or by a common cover after inserting the specimens.

13. The method according to claim 10;
wherein the gel body is initially heated in the area of a cutout in which a specimen is to be inserted;
wherein the specimen is then inserted into the cutout;
wherein a medium which is initially liquid but which then hardens within a period of time and below a given temperature is then introduced into the cutout; and
wherein the gel body is then cooled in the area of this cutout in order to shorten the period of time.

14. The method according to claim 13;
wherein the gel body is heated in the area of a first cutout within a given time interval;
wherein the specimen is then inserted into the first cutout and positioned in the first cutout;
wherein the hardening medium is then introduced into this cutout and the gel is heated in the area of a second cutout at the same time;
wherein the gel is then cooled in the area of the first cutout;
wherein the specimen is inserted into the second cutout and positioned therein, at which time the hardening medium is introduced, and the gel is preheated in the area of a third cutout;
wherein the gel is then cooled in the area of the second cutout;
wherein the specimen is inserted into the third cutout and positioned therein, at which time the hardening medium is introduced, and the gel is preheated in the area of a fourth cutout, and so on until a specimen is contained and positioned in every cutout and is fixed by the hardened medium.

15. The method according to claim 1;
wherein a plurality of specimens are kept in a specimen reservoir, the specimens are removed individually from the specimen reservoir, and each specimen is inserted into a cutout allocated to it; and
wherein the singling of the specimens and the insertion into the cutouts is carried out in an automated manner.

16. The method according to claim 1;
wherein the specimens are first singled, the specimens are then individually embedded in individual gel bodies of identical shape and dimensions; and
wherein the gel bodies, each of which contains a specimen, are then moved into the specimen space successively in time and are removed from the specimen space again after detection of the respective specimen.

17. The method according to claim 1;
wherein the specimens are moved individually through a syringe to their positions at an outer surface or an inner surface of a supporting device, at a capillary opening, or in a gel body.

* * * * *